United States Patent
Yeung et al.

(10) Patent No.: US 7,961,613 B2
(45) Date of Patent: Jun. 14, 2011

(54) SYSTEM AND METHOD OF MONITORING PACKETS IN FLIGHT FOR OPTIMIZING PACKET TRAFFIC IN A NETWORK

(75) Inventors: Wilson Chuen Yew Yeung, Campbell, CA (US); Brian Matsuo, Mountain View, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 123 days.

(21) Appl. No.: 12/320,823

(22) Filed: Feb. 5, 2009

(65) Prior Publication Data

US 2010/0195495 A1    Aug. 5, 2010

(51) Int. Cl.
*G01R 31/08* (2006.01)
(52) U.S. Cl. .................. 370/231; 370/229; 370/235
(58) Field of Classification Search ............... None
See application file for complete search history.

(56) References Cited

U.S. PATENT DOCUMENTS

| | | | |
|---|---|---|---|
| 5,781,801 A * | 7/1998 | Flanagan et al. | 710/56 |
| 6,633,539 B1 * | 10/2003 | Basso et al. | 370/229 |
| 7,035,214 B1 * | 4/2006 | Seddigh et al. | 370/231 |
| 7,305,486 B2 * | 12/2007 | Ghose et al. | 709/232 |
| 2002/0150048 A1 * | 10/2002 | Ha et al. | 370/231 |
| 2003/0088692 A1 | 5/2003 | Badovinatz et al. | |
| 2007/0041319 A1 | 2/2007 | Chilukoor et al. | |
| 2010/0046370 A1 * | 2/2010 | Ghose et al. | 370/235 |

FOREIGN PATENT DOCUMENTS

EP    0695053    1/1996

OTHER PUBLICATIONS

Notification of Transmittal of the International Search Report and the Written Opinion of the International Searching Authority, or the Declaration dated Jul. 30, 2010 in a corresponding PCT application, 13 pps.

Floyd et al, "Random Early Detection (RED) gateways for Congestion Avoidance".

Fall et al "Simulation-based Comparisons of Tahoe, Reno and SACK TCP".

* cited by examiner

*Primary Examiner* — Chi H Pham
*Assistant Examiner* — Kouroush Mohebbi
(74) *Attorney, Agent, or Firm* — Buchanan Ingersoll & Rooney PC

(57) ABSTRACT

Systems and methods of optimizing packet flow in a network are disclosed. An internetwork includes plural networks, each network having plural non-router nodes and at least one router node. The non-router node of a first network can be configured to perform congestion control. The non-router node sends a request packet to a node in a second network. The value of a packet-in-flight counter associated with the network is adjusted when the request packet is sent to the second network node and when a response packet is received from the second network node. The non-router node determines whether another request packet can be sent to another network in the internetwork based on a value of the packet-in-flight counter.

23 Claims, 6 Drawing Sheets

QUEUE-B, PIF-INITIAL-B = 3, PIF-UNACKED-B = 0

| RP:B1 | RP:B2 | RP:B3 | RP:B4 |

QUEUE-C, PIF-INITIAL-C = 1, PIF-UNACKED-C = 0

| RP:C4 | RP:C2 | RP:C1 | RP:C3 |

QUEUE-D, PIF-INITIAL-D = 2, PIF-UNACKED-D = 0

| RP:D2 | RP:D3 | RP:D1 | RP:D4 |

FIG. 4A

QUEUE-B, PIF-INITIAL-B = 3, PIF-UNACKED-B = 3

| RP:B1 |

QUEUE-C, PIF-INITIAL-C = 1, PIF-UNACKED-C = 1

| RP:C4 | RP:C2 | RP:C1 |

QUEUE-D, PIF-INITIAL-D = 2, PIF-UNACKED-D = 2

| RP:D2 | RP:D3 |

FIG. 4B

QUEUE-B, PIF-INITIAL-B = 3, PIF-UNACKED-B = 3

| RP:B1 |

QUEUE-C, PIF-INITIAL-C = 1, PIF-UNACKED-C = 0

| RP:C4 | RP:C2 | RP:C1 |

QUEUE-D, PIF-INITIAL-D = 2, PIF-UNACKED-D = 2

| RP:D2 | RP:D3 |

FIG. 4C

QUEUE-B, PIF-INITIAL-B = 3, PIF-UNACKED-B = 3

| RP:B1 |

QUEUE-C, PIF-INITIAL-C = 1, PIF-UNACKED-C = 1

| RP:C4 | RP:C2 |

QUEUE-D, PIF-INITIAL-D = 2, PIF-UNACKED-D = 2

| RP:D2 | RP:D3 |

FIG. 4D

SYSTEM AND METHOD OF MONITORING PACKETS IN FLIGHT FOR OPTIMIZING PACKET TRAFFIC IN A NETWORK

FIELD

The disclosed systems and methods are generally directed to communication and data interchange between nodes in a computer network or internetwork, particularly Internet Protocol based networks and internetworks. The exemplary embodiments are particularly aimed at the efficient and economical transmission of data between computer nodes.

BACKGROUND

An internetwork is a collection of distinct computer networks connected using a common routing technology. The "Internet" is an example of such an internetwork, where communication between nodes in distinct networks is facilitated by an internetworking protocol standard, the Internet Protocol (IP) Suite.

The proper noun "Internet" (capitalized) refers to a global, publicly accessible system of interconnected packet switched networks that interchange data using the Internet Protocol Suite.

Internetworks which are not the "Internet" but which use the Internet Protocol Suite are sometimes referred to variously as an "internet", "IP internetwork", "private internet", "private IP internetwork" or "private IP network". That is to say, that the "Internet" is merely one example of an IP based internetwork, although it is a very popular one owing to its global and publicly accessible nature.

As is generally known in IP networks, in order for a node in an IP internetwork to send data to another node on the IP internetwork, the data must be encapsulated within an IP packet.

FIG. 1A is a block diagram of a computer network consistent with the prior art. As shown in FIG. 1A, Node 1, Node 2, Node 3 and Node 4 are all connected to a computer network 10. For data interchange to occur between networks, an internetwork must be formed. The formation of an internetwork depends on the use of certain nodes, which are distinguished as "routers."

FIG. 1B is a block diagram of an internetwork consistent with the prior art. As shown in FIG. 1B, the internetwork 20 includes a Network A, a Network B, a Network C, and a Network D. Each of these networks includes a special node that is distinguished by a circle. The special nodes Node A, Node B, Node C, and Node D, are routers, and will hereafter be designated Router A, Router B, Router C, and Router D, respectively.

In one example, if Node C3 of Network C sends a packet to Node A1 of Network A, the packet must first be sent to Router C of Network C. Router C in turn, sends the packet to Router B of Network B. From Router B, the packet is sent to Router A of Network Router A, which delivers the packet to Node A1 of Network A. The nomenclature for how a packet is routed from one node to another between networks is often referred to as the "path" between nodes. A path is an ordered list of routers, and each element of a path is variously referred to as an "intermediary node," an "intermediate node," or more simply a "hop."

For example, the path from Node C3 to Node A1 can be designated by P=(C, B, A), where routers C, B, and A are all hops or intermediary nodes in the ordered list P.

Paths between nodes and routers can be formed dynamically or statically. Communication protocols, such as, Routing Information Protocol (RIP), Border Gateway Protocol (BGP), and Open Shortest Path First (OSPF) are examples of dynamic internetworking protocols that are used in IP internetworks.

Congestion control can be described notionally as controlling the rate of entry traffic of packets into a given network with the goal of maximizing ideal throughput between communicating nodes while avoiding congestive collapse. Congestive collapse is a condition where there is little or no useful communication happening because of congestion.

In a packet switched internetwork such as an IP internetwork, there are two popular methods by which congestion control can be achieved:

1. Routers Discard Packets. Routers in an internetwork perform congestion control by discarding packets sent by nodes that would otherwise cause the maximum packet or data rate between two routers to be exceeded. Such an example is found in the method described in the paper "Random Early Detection (RED) Gateways for Congestion Avoidance" by Sally Floyd and Van Jacobson.

2. Non-Router Nodes Perform End-To-End Congestion Control. A node may use congestion avoidance algorithms like Transmission Control Protocol (TCP) congestion avoidance, which performs congestion control between two non-router nodes in an IP internetwork. TCP congestion avoidance has multiple variations, including the variations TCP Reno, TCP Tahoe, and TCP Vegas. The paper "Simulation-based Comparisons of Tahoe, Reno and SACK TCP" by Kevin Fall and Sally Floyd is a useful reference as is the paper "Congestion Avoidance and Control" by Van Jacobson.

Methods that are similar to the "Routers Discard Packets" method described above are not end-to-end congestion control models. "RED Gateway for Congestion Avoidance" by Sally Floyd and Van Jacobson describes a method by which routers and the intermediate hops of a path discard packets to enforce maximum link capacity.

Methods that are similar to TCP congestion avoidance, while end-to-end, do not consider the intermediate hops (routers) of an internetwork path as congestion points. In the TCP congestion avoidance technique, decisions on whether to send a packet are based on the communication success rate of an end-point in isolation.

SUMMARY

The exemplary embodiments described herein optimize packet traffic between two endpoints on a network by considering the amortized success and failure rate of an intermediate node. This method of congestion control differs from other methods of congestion control and provides for end-to-end congestion control that uses the maximum capacity of a router of a network as the primary consideration when deciding whether a packet is to be sent.

An exemplary method of congestion control in an internetwork having plural networks is disclosed. The method comprises sending a request packet to a node in a second network; adjusting the value of a packet-in-flight counter when the request packet is sent to the second network node or whether a response packet is received from the second network node; and determining whether another request packet can be sent based on a value of the packet-in-flight counter.

Another exemplary method is directed to congestion control at a node in a first network of an internetwork of plural networks. The method comprises sending a first request packet from a node in a first network to a node in a second network; decrementing a packet-in-flight counter of the first network node; and initiating a timer of the first network node. The method further comprises incrementing the packet-in-flight counter of the first network node when a response packet is received from the second network node or an expiry time of the timer is exceeded; and determining whether a second request packet can be sent from the first network node based on a value of the packet-in-flight counter.

An exemplary computer readable medium is encoded with a program for executing congestion control at a processor-based node of a first network in an internetwork of plural networks. The computer readable medium comprises a first module that sends a request packet to a node in a second network; a second module that adjusts the value of a packet-in-flight counter based on one of sending the request packet to the second network node, receiving a response packet from the second network node, and an expiry time of a timer associated with the request packet; and a third module that determines whether another request packet can be sent based on a value of the packet-in-flight counter.

An exemplary method is directed to congestion control in an internetwork having plural networks. The method comprising in nodes of a first network among said plural networks, establishing a plurality of packet queues and packet-in-flight counters that are respectively associated with other networks among said plural networks. For request packets that are to be sent from a node in the first network to a node in a given one of said other networks, the method further comprises loading the packet associated with the given network queue with at least one request packet, wherein the at least one request packet is destined for a node in the given network of the internetwork; sending the at least one request packet to the node in the given network; adjusting a value of the packet-in-flight counter associated with the given network in one direction when the request packet is sent to the node in the given network, and adjusting said packet in-flight counter in the other direction when a response packet is received from the node in the given network; and determining whether another request packet can be sent to the node in the given network based on a value of the packet-in-flight counter.

DESCRIPTION OF THE DRAWINGS

In the following, exemplary embodiments of the invention will be described in greater detail with reference to the drawings, wherein:

FIGS. 4A-4D are schematic diagrams of each network queue during the congestion control process in accordance with an exemplary embodiment.

DETAILED DESCRIPTION

Figure 1A:
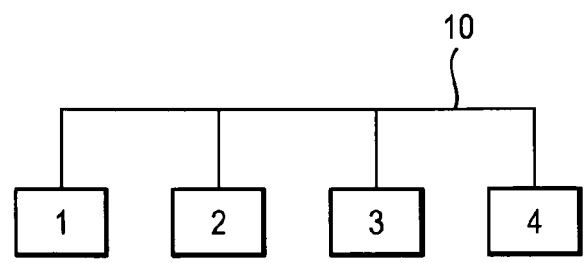
FIG. 1A is a block diagram of a computer network in accordance with the prior art.
Figure 1B:
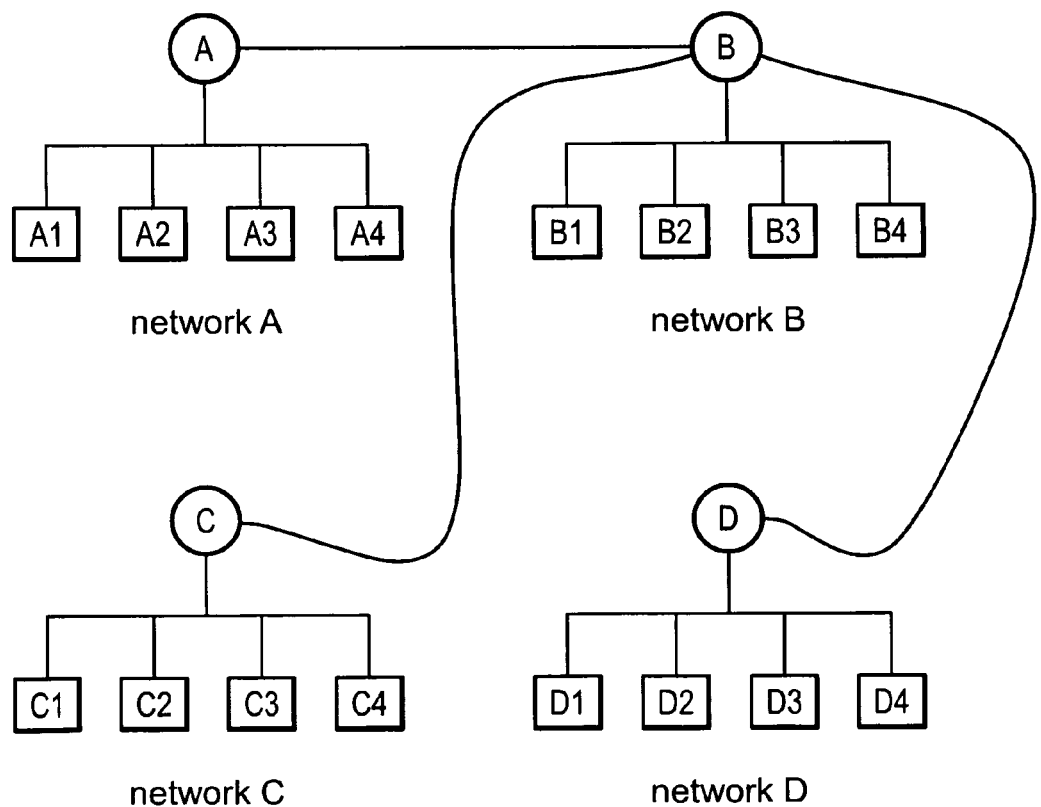
FIG. 1B is a block diagram of an internetwork in accordance with the prior art.
Figure 2A:
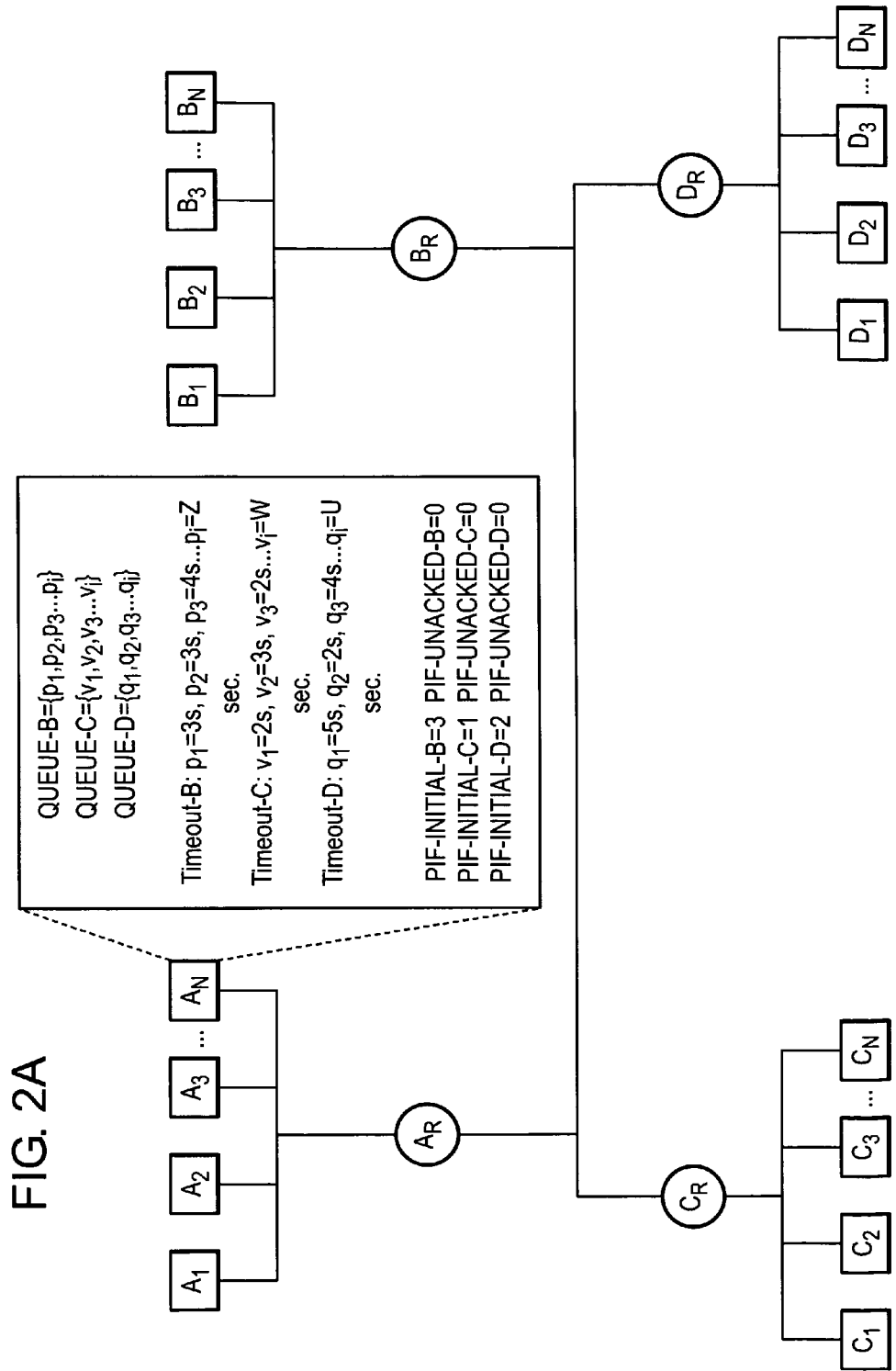
FIG. 2A is a schematic diagram of an internetwork in accordance with an exemplary embodiment.

FIG. 2A is a schematic diagram of an internetwork in accordance with an exemplary embodiment. As shown in FIG. 2A, a packet switched internetwork 200 includes packet switched networks A through D. Each of the packet switched networks includes plural non-router nodes and at least one router node. For example, network A includes plural non-router nodes $A_1$-$A_N$ and a router $A_R$, network B includes plural non-router nodes $B_1$-$B_N$ and a router $B_R$, network C includes plural non-router nodes $C_1$-$C_N$ and a router $C_R$, and network D includes plural non-router nodes $D_1$-$D_N$ and a router $D_R$. Hereinafter, common characteristics of a packet switched network in internetwork 200 will be described with respect to exemplary Networks X and Y (not shown).

In an exemplary embodiment, a non-router node in an IP internetwork can be configured to send packets to other non-router nodes in the internetwork 200. The node that sends such packets over the internetwork will hereafter be known as the "Sending Node." The nodes that are intended to receive packets over the internetwork will hereafter be known as the "Receiving Nodes." Specifically, the exemplary embodiment addresses an instance in which a Sending Node in a given packet switched network of a packet switched internetwork sends packets to Receiving Nodes of different networks in the same internetwork.

For example, Node A2 (the Sending Node) in Network A can be configured to send packets to Receiving Nodes Node B1, Node B2, Node B3, and Node B4 on Network B; Node C1, Node C2, Node C3, and Node C4 on Network C; and Node D1, Node D2, Node D3, and Node D4 on Network D.

It is generally true that whenever a Sending Node sends a packet to a Receiving Node, the Sending node expects a packet as acknowledgement in response to the original sent packet within some amount of time after the original packet was sent. The acknowledgement packet may contain only an acknowledgement or may contain response data (which implies acknowledgement). The packet originating from the Sending Node will be referred to as the Request Packet, and the packet sent by the Receiving Node as the Response Packet.

One of ordinary skill will appreciate that for any internetwork, the path between one network to any other network has a maximum (possibly variable) latency and data throughput rate. An exemplary embodiment provides a method for end-to-end congestion control that uses the maximum capacity of a router of a network as the primary consideration when deciding whether a packet is to be sent.

At the Network X, each other packet switched network in the internetwork, such as a Network Y (not shown), has an associated packet queue. For example, a QUEUE-Y designates a queue of Request Packets that are to be sent from a node in Network X to Receiving Nodes in the Network Y. An implementation of the packet queue is shown in FIG. 2A. For example, Network A can include a QUEUE-B, a QUEUE C, and QUEUE D. Similarly, although not shown, Network B can include a QUEUE-A, a QUEUE-C, and a QUEUE D; Network C can include a QUEUE-A, a QUEUE B, and a QUEUE D; and Network D can include a QUEUE-A, a QUEUE B, and a QUEUE C.

A timeout value Timeout is associated with each Request Packet that a Sending Node sends to a Receiving Node. One of ordinary skill will appreciate that the value of Timeout for each Request Packet need not be the same, and may in fact be different for every Request Packet sent by the Sending Node. The value Timeout represents the maximum time in seconds (possibly fractional) that the Sending Node will wait to receive a Response Packet from the Receiving Node before declaring that either the Request Packet or the Response Packet is lost.

A maximum allowable packets-in-flight counter can be defined at one network in the internetwork for each other network in the internetwork 200. For example, with regard to the Network X, a packets-in-flight counter with respect to Network Y can be designated as PIF-INITIAL-Y. The counter PIF-INITIAL-Y for the Network Y can be assigned an initial integer value that is greater than 0. Moreover, the initial value for each PIF-INITIAL at the Network X can be different for each network. The PIF-INITIAL value represents the maximum number of unacknowledged request packets that may be sent to a given network. An exemplary implementation of the packets-in-flight counter is shown in FIG. 2A. For example, for the Network A, a PIF-INITIAL-B is associated with Network B, a PIF-INITIAL-C is associated with Network C, and a PIF-INITIAL-D is associated with Network D.

An unacknowledged request packet is a request packet for which either a response packet has not yet been received by the Sending Node or for which an expiry time has not yet been exceeded. The expiry time can be defined as follows:

Expiry-Time=Current-Time+Timeout.

Plural current unacknowledged packets-in-flight counters can be defined at one network in the internetwork for each other network in the internetwork. For an exemplary Network X, the current unacknowledged packets-in-flight counter for a Network Y can be designated as PIF-UNACKED-Y. The PIF-UNACKED value can be an integer value having an initial value 0. The PIF-UNACKED value represents the current number of unacknowledged request packets that have been sent to a given network. As defined earlier, an unacknowledged request packet is a request packet for which either a response packet has not yet been received by the Sending Node or for which the expiry time has not yet been exceeded. An exemplary implementation of the current unacknowledged packets-in-flight counter is shown in FIG. 2A. For example, with respect to Network A, a PIF-UNACKED-B is associated with Network B, a PIF-UNACKED-C is associated with Network C, and a PIF-UNACKED-D is associated with Network D.

Figure 2B:
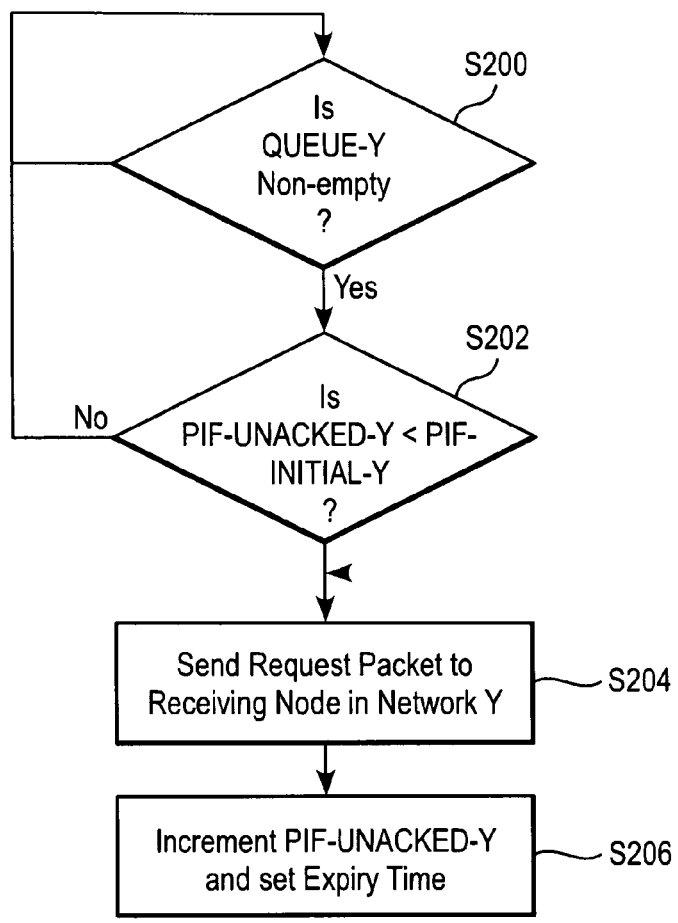
FIGS. 2B and 2C are flow diagrams of a congestion control method in accordance with an exemplary embodiment.
Figure 2C:
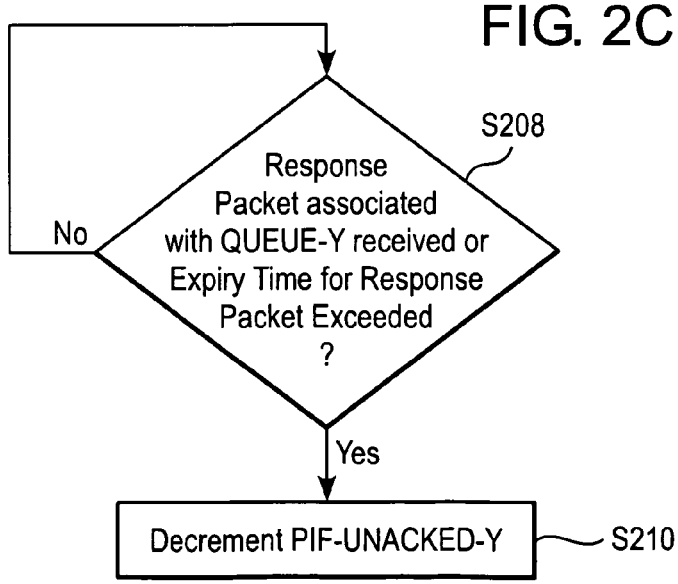

FIGS. 2B and 2C are flow diagrams of a congestion control method in accordance with an exemplary embodiment.

As shown in FIG. 2B, a sending node can send a request packet to a receiving node if two conditions are met. First, for a Network X, the packet queue QUEUE-Y associated with a receiving node in Network Y must be non-empty (S200). Second, the PIF-UNACKED-Y value associated with the Network Y must be less than the PIF-INITIAL-Y also associated with the Network Y (S202). If these two conditions are met then a packet is removed from QUEUE-Y in Network X and sent to the Receiving Node in Network Y (S204). The value of PIF-UNACKED-Y is incremented and the expiry time of the sent Request Packet is set to be Expiry-Time=Current-Time+Timeout (step S206). On the other hand, if the value of PIF-UNACKED-Y is equal to PIF-INITIAL-Y, then the Sending Node in Network X does nothing at that time.

As shown in FIG. 2C, if a Response Packet is received at Network X from a Receiving Node in Network Y, the counter PIF-UNACKED-Y is decremented (S208). On the other hand, if a Response Packet is not received at Network X from a Receiving Node in Network Y, the Sending Node determines whether the Expiry-Time is exceeded (S208). If the Expiry-Time for a Request Packet sent to a Receiving Node in Network Y has been exceeded, then the counter PIF-UNACKED-Y is decremented (S210). Whenever the value of the counter PIF-INITIAL-Y for any given Network Y is greater than 0, then for a Sending Node in a Network X, Step S200 can be repeated with respect to a Receiving Node in a Network Y.

In an alternative embodiment, rather than incrementing a counter when a packet is sent to a Receiving node and decrementing a counter when a packet is received from a Receiving node or the expiry time has been exceeded, the system can be configured to decrement a counter when a packet is sent and increment a counter when a packet is received or the expiry time has been exceeded. For example, in an exemplary Network X, the counter PIF-UNACKED-Y can be replaced with the counter PIF-REMAINING-Y, where PIF-REMAINING-Y represents the allowable remaining packets-in-flight in the Network X with respect to a Network Y. In this case, the initial value of PIF-REMAINING-Y is set to PIF-INITIAL-Y. As long as PIF-REMAINING-Y is greater than 0, a packet from QUEUE-Y may be sent to the Network Y. When a packet is sent, PIF-REMAINING-Y is decremented by 1. When a response packet is received from the Network Y or the expiry time is exceeded then PIF-REMAINING-Y is incremented.

Figure 3:
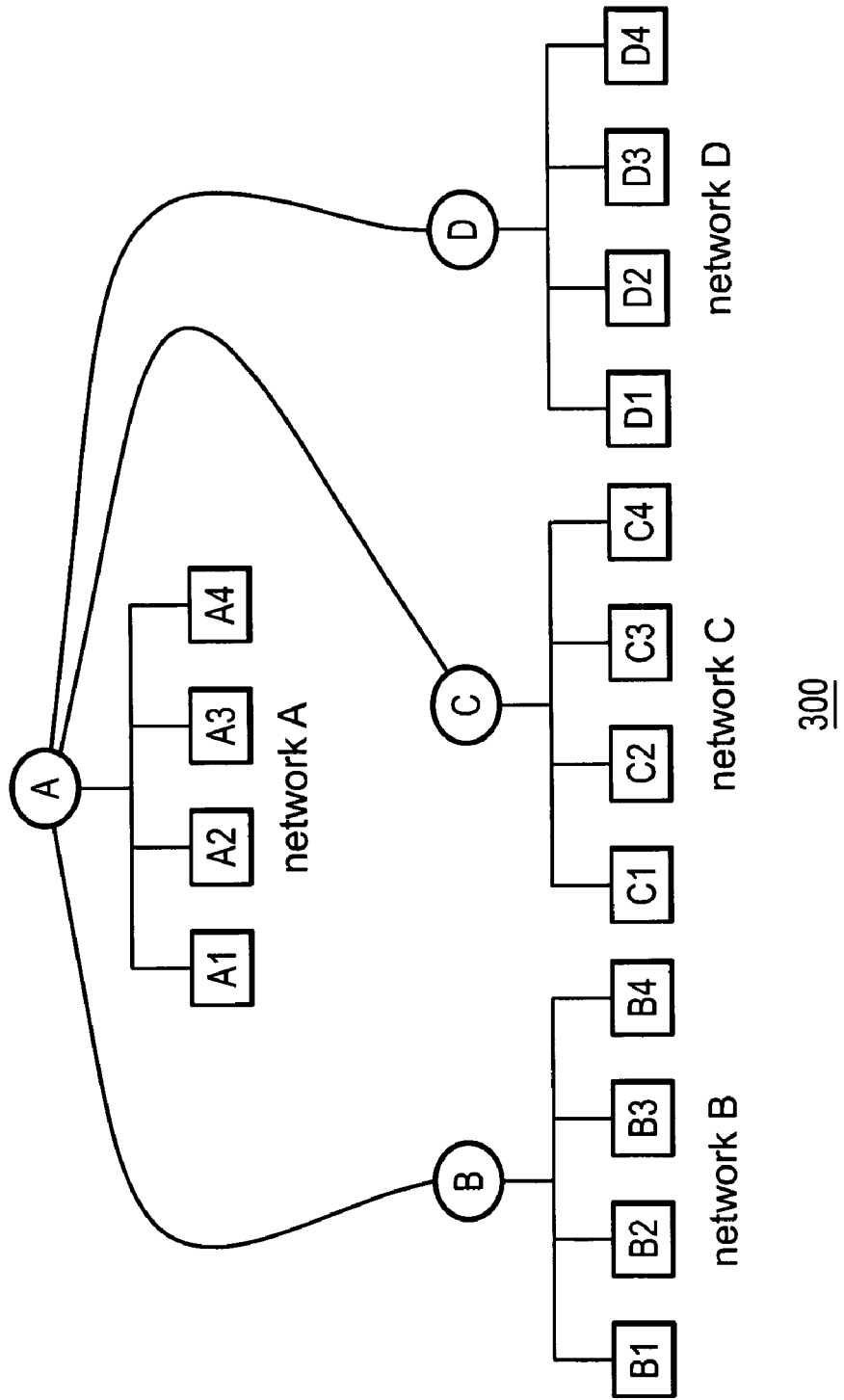
FIG. 3 is a schematic diagram of an internetwork in accordance with an exemplary embodiment.

FIG. 3 is a schematic diagram of an internetwork in accordance with an exemplary embodiment.

As shown in FIG. 3, an internetwork 300 includes plural networks designated as network A, network B, network C, and network D. Each network is comprised of plural nodes. The plural nodes and their membership to a respective network can be defined as follows:

Network A includes nodes A1, A2, A3, A4;
Network B includes nodes B1, B2, B3, B4;
Network C includes nodes C1, C2, C3, C4; and
Network D includes nodes D1, D2, D3, D4

One of ordinary skill will appreciate that the internetwork 300 may have any number of networks and each network may have any number of plural nodes as desired. The number of networks and the number of nodes per network can vary by implementation.

In an exemplary implementation based on the internetwork 300, Node A1 can send a Request Packet to each of the nodes B1, B2, B3, B4, C1, C2, C3, C4, D1, D2, D3, D4. In order to distinguish one packet from another packet, the Request Packets destined to each of the nodes can be denoted with the label RP:RECEIVING-NODE. For example, a Request Packet destined for Receiving Node B1 is labeled as RP:B1, and a Request Packet destined for Receiving Node C2 is labeled as RP:C2, and so on.

Each of the Request Packets destined for nodes B1-B4, C1-C4, and D1-D4 can be enumerated as follows:

RP:B1, RP:B2, RP:B3, RP:B4, RP:C1, RP:C2, RP:C3, RP:C4, RP:D1, RP:D2, RP:D3, and RP:D4.

Each Request Packet has an associated expiry time or timeout value T in seconds. The timeout values for the Request Packets need not all be the same, and can be unique for each Request Packet as desired.

The Request Packets are organized based on the destination network to which the Receiving Nodes correspond. That is, for the Network A, a queue can be created for each of the Networks B, C, and D, where a Request Packet is a member of the queue if the node associated with the Request packet is a member of the network associated with the queue. Furthermore, the Initial Packets-In-Flight (PIF-INITIAL) variable can be set to some initial value for each of the queues, and the Unacknowledged Packets-In-Flight (PIF-UNACKED) variable for each of the queues can be set to 0.

In the discussion below, the congestion control method as shown in FIGS. 2B and 2C will be described in the context of an implementation of internetwork 300.

A Node A1 can send a Request Packet to any of the nodes B1-B4, C1-C4, and D1-D4, if each network queue is non-empty and the value of PIF-INITIAL for each queue is initialized (S200).

FIG. 4A illustrates an exemplary status of each queue following the completion of S200. As shown in FIG. 4A, each queue is loaded with respective Request Packets, and an Initial PIF value for each queue is initialized to PIF-INITIAL-B=3, PIF-INITIAL-C=1, PIF-INITIAL-D=2.

A Request Packet can be removed from a queue and sent to the designated receiving node, if the PIF-UNACKED value of a queue is less than the respective PIF-INITIAL value (S202, S204). Also, the PIF-UNACKED value is incremented by one (S206). If, on the other hand, the PIF-UNACKED value of the queue is not less than the respective PIF-INITIAL value of the queue then the process returns to step S200 to determine whether the queue is non-empty.

Steps S200-S206 can be repeated for each queue until the PIF-UNACKED value is equal to the PIF-INITIAL value.

FIG. 4B illustrates an exemplary status of queues QUEUE-B, QUEUE-C, and QUEUE-D of Network A following the completion of step S206 and when the PIF-UNACKED value is equal to the PIF-INITIAL value.

In comparing FIGS. 4A and 4B, one of ordinary skill will appreciate that packets have been removed from their respective queues, and sent to a designated Receiving Node based on the queue and network to which each respective packet is associated as follows:

Network B, Queue B: RP:B4, RP:B3, RP:B2
Network C, Queue C: RP:C3
Network D, Queue D: RP:D4, RP:D1

Whenever the PIF-UNACKED value of a network is less than the PIF-INITIAL value of the network, packets for a queue associated with the network can be removed. Upon removal from the queue, the packets are sent to the designated Receiving Node, and the value of counter PIF-UNACKED is updated to reflect the number of packets that are unacknowledged. A packet is unacknowledged when no response has been received from the Receiving Node or the expiry time of the packet has not been exceeded.

Turning again to the congestion control method of FIG. 2C a packet is declared lost if an expiry time for a sent packet is exceeded. Alternatively, a packet communication is successful if a respective Response Packet is received (S208). In either case, the value of counter PIF-UNACKED for the Network is decremented by one (S210).

For example, if RP:C3 is declared successful or lost, then the value of PIF-UNACKED-C is decremented by one such that PIF-UNACKED-C=0.

FIG. 4C is a schematic diagram that reflects an exemplary status of each queue in Network A following the completion of step S208.

As shown in FIG. 4C, PIF-UNACKED-C=0, which is less than PIF-INITIAL-C=1. As a result, the next packet in QUEUE-C is removed (RP:C1) and sent to the Receiving Node C1. The PIF-UNACKED-C value is incremented by 1 such that PIF-UNACKED-C=1.

FIG. 4D is a schematic diagram illustrating an exemplary status of each queue following the completion of step S210. As shown in FIG. 4D, RP:C1 has been removed from QUEUE-C and PIF-UNACKED-C=1.

One of ordinary skill will appreciate that the set of Request Packets that are to be sent need not be fixed. For example, if during the life of an application running on the Sending Node, an additional packet is to be sent to another node, the Request Packet can be loaded into the appropriate queue associated with the appropriate network.

The algorithm shown in FIGS. 2B and 2C can be executed by a processor at a Sending Node so that the Sending Node can perform congestion control on a per network basis.

Figure 5:
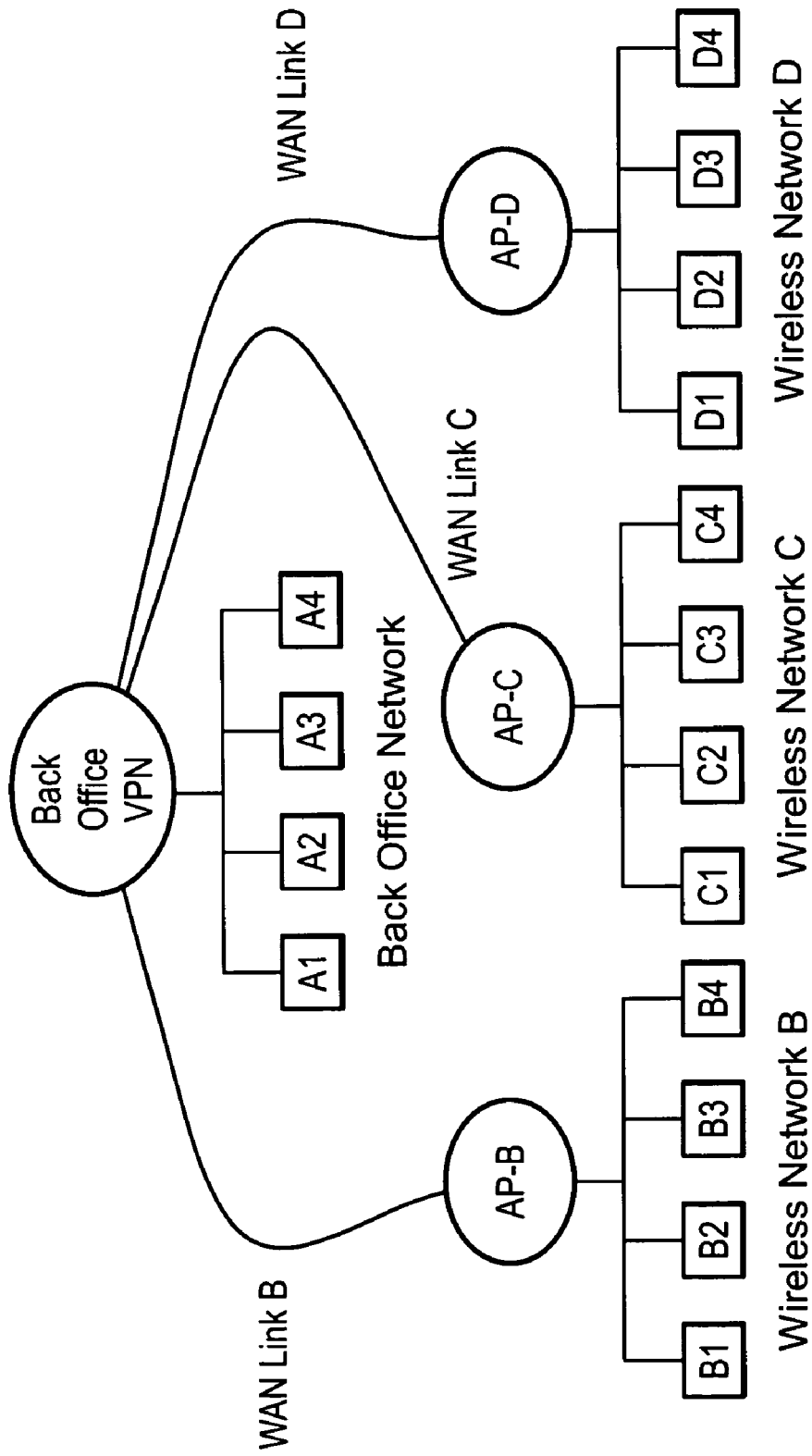
FIG. 5 is a schematic diagram of a utility monitoring and control network in accordance with an exemplary embodiment.

The exemplary embodiments can be implemented in a variety of different types of communication systems. One illustrative example is a utility monitoring and control network. FIG. 5 is a schematic diagram of a utility monitoring and control network in accordance with an exemplary embodiment. The utility monitoring and control network can be configured based on the exemplary internetwork implementation of FIG. 3. The exemplary utility monitoring and control network can have the following node and network definitions:

Network A can be designated as a Utility Back Office Network.

Router A can be designated as a Back Office Virtual Private Network (VPN) concentrator.

Router B, Router C, and Router D can be designated as Wireless Access Points and hereinafter referred to as Access Point B, Access Point C, and Access Point D, or AP-B, AP-C, and AP-D, respectively.

Network B, Network C, and Network D can be designated as Wireless Mesh Networks.

Interlinks between AP-A, AP-B, and AP-C can be Wide Area Network (WAN) Links. The nature of the WAN Link can be one of numerous types, including Ethernet, Code Division Multiple Access (CDMA), General Packet Radio Service (GPRS), Evolution Data Optimized (EVDO), Wideband Code Division Multiple Access (WCDMA), or any other suitable WAN Link as desired.

Each of the Nodes B1-B4, C1-C4, and D1-D4 can be designated as nodes in a wireless mesh network.

Each of the Nodes B1-B4, C1-C4, and D1-D4 can be connected via a serial line to a utility metering device. The utility metering device can be designated as an electric meter, a gas meter, or a water meter of either residential or commercial and industrial variety, or any other suitable metering device as desired.

The processor of each of the Nodes B1-B4, C1-C4, and D1-D4 can be configured through software to send queries and commands to connected utility metering devices and send the results of those queries and commands to other nodes in the internetwork based on the congestion control algorithm illustrated in FIGS. 2B and 2C.

The exemplary systems and method described above provide several advantages over conventional congestion control and/or avoidance techniques. In particular, the exemplary system and methods for monitoring packets-in-flight in a network as described herein, on the other hand, are not implemented by the routers, but rather by a non-router Sending Node. Moreover, the above-described system and methods bases a decision to send packets to a network on the capacity of the router of the network in aggregate, rather than the capacity of a single node of the network in isolation.

The systems and methods described herein can be implemented through software code that is encoded, recorded, or stored on a computer readable medium. The computer readable medium can be used in configuring each sending node, which is connected to an internetwork as described above. One of ordinary skill in the art will appreciate that the computer readable medium can include an optical disk, floppy disk, flash memory, magnetic tape, or any tangible storage device or medium as desired.

One of ordinary skill will appreciate that the congestion control system and methods described here can accommodate an arbitrary number of networks and internetworks, an arbitrary number of request packets, and an arbitrary number of nodes in each network.

While the invention has been described with reference to specific embodiments, this description is merely representative of the invention and is not to be construed to limiting the invention. Various modifications and applications may occur to those skilled in the art without departing from the true spirit and scope of the invention as defined by the appending claims.

What is claimed is:

1. A method of congestion control in an internetwork having a first network and at least plural second networks, the method comprising:
    establishing a respective packet-in-flight counter for each of the plural second networks;
    sending a request packet from a node in the first network to any of a plurality of nodes in any one of the plural second networks;
    incrementing the respective packet-in-flight counter of said any one of the plural second networks based on a request packet being sent to any node in said any one of the plural second networks;
    decrementing the respective packet-in-flight counter of said any one of the plural second networks to which a request packet is sent based on a response packet being received from any of the plurality of nodes in said any one of the plural second networks; and
    determining whether a second request packet can be sent from a node of the first network node to any of the plurality of nodes in said any one of the plural second networks based on a value of the respective packet-in-flight counter for said any one of the plural second networks.

2. The method of claim 1, wherein sending the first request packet comprises:
    determining whether a packet queue of the first network for said any one of the plural second networks to which a request packet is sent is non-empty; and
    calculating a value of the respective packet-in-flight counter of said any one of the plural second networks to which a request packet is sent.

3. The method of claim 2, wherein calculating the value of the respective packet-in-flight counter of said any one of the plurality of networks to which a request packet is sent comprises:
    comparing, for said any one of the second networks to which a request packet is sent, a maximum number of packets-in-flight to a current number of packets-in-flight.

4. The method of claim 1, further comprising:
    initiating a timer of the first network.

5. A method of congestion control at a node in a first network of an internetwork of plural networks, the method comprising:
    establishing a respective packet-in-flight counter for each one of plural second networks in the internetwork;
    sending a request packet to any of a plurality of nodes in any one of the plural second networks;
    adjusting a value of the respective packet-in-flight counter for said any one of the plural second networks to which a request packet is sent based on the request packet being sent to any of the plurality of nodes in said any one of the plural second networks and based on a response packet being received from any of the plurality of nodes in said any one of the plural second networks; and
    determining whether another request packet can be sent to any of the plurality of nodes in said any one of the plural second networks based on a value of the respective packet-in-flight counter for said any one of the plural second networks.

6. The method of claim 5, wherein:
    adjusting the value of the respective packet-in-flight counter for said any one of the plural second networks to which a request packet is sent includes decrementing the respective packet-in-flight counter for said any one of the plural second networks to which the request packet is sent when the request packet is sent to any of the plurality of nodes in said any one of the plural second networks.

7. The method of claim 5, wherein:
    adjusting the value of the respective packet-in-flight counter for said any one of the plural second networks to which a request packet is sent includes incrementing the respective packet-in-flight counter of said one of the plural second networks to which the request packet is sent when the response packet is received from any of the plurality of nodes in said any one of the plural second networks.

8. The method of claim 5, further comprising:
    initiating a timer associated with the request packet when the request packet is sent to any of the plurality of nodes in said any one of the plural second networks.

9. The method of claim 8, further comprising:
    incrementing the respective packet-in-flight counter of said any one of the plural second networks to which a request packet is sent when an expiry time of the timer is exceeded before a response packet is received from any of the plurality of nodes in said any one of the plural second networks.

10. The method of claim 9, wherein the expiry time of the timer equals a current value of the timer plus a timeout value of the request packet sent to the any of a plurality of nodes in the any one of the plural second networks.

11. The method of claim 5, further comprising:
    incrementing the respective packet-in-flight counter of said any one of the plural second networks when the request packet is sent to any of the plurality of nodes in said any one of the plural second networks.

12. The method of claim 5, further comprising:
    decrementing the respective packet-in-flight counter of said any one of the plural second networks to which a request packet is sent when the response packet is received from any of the plurality of nodes in said any one of the plural second networks.

13. The method of claim 12, wherein calculating the value of the packet-in-flight counter comprises:
    comparing, for said any one of the plural second networks to which a request packet is sent, a maximum number of packets-in-flight to a current number of packets-in-flight.

14. The method of claim 11, wherein the expiry time of the timer equals a current value of the timer plus a timeout value of the request packet sent to the any of a plurality of nodes in the any one of the plural second networks.

15. A non-transitory computer readable medium encoded with a
program that causes a processor-based node of a first network in an internetwork of plural networks to execute a method of congestion control, the method, comprising:
    establishing a respective packet-in-flight counter for each one of plural second networks in the internetwork;

sending a request packet to any of a plurality of nodes in any one of the plural second networks;

adjusting the value of the respective packet-in-flight counter for said any one of the plural second networks to which the request packet is sent based on one of sending the request packet to any of the plurality of nodes in said any one of the plural networks, receiving a response packet from any of the plurality of nodes in said any one of the plural networks, and an expiry time of a timer associated with the request packet; and determining whether another request packet can be sent to any of the plurality of nodes in said any one of the plural second networks based on a value of the respective packet-in-flight counter for said any one of the plural second networks.

16. The non-transitory computer-readable medium of claim 15, wherein:

adjusting the value of the respective packet-in-flight counter for said any one of the plural second networks to which a request packet is sent includes decrementing the respective packet-in-flight counter when the request packet is sent to any of the plurality of nodes in said any one of the plural second networks.

17. The non-transitory computer-readable medium of claim 15, wherein:

adjusting the value of the respective packet-in-flight counter for said any one of the plural second networks to which a request packet is sent includes incrementing the respective packet-in-flight counter for said any one of the plural second networks to which a request packet is sent when the response packet is received from any of the plurality of nodes in said any one of the plural second networks.

18. The non-transitory computer-readable medium of claim 15, wherein:

adjusting the value of the respective packet-in-flight counter for said any one of the plural second networks to which a request packet is sent includes incrementing the respective packet-in-flight counter for said any one of the plural second networks to which a request packet is sent when the expiry time of the timer is exceeded before the response packet is received from any of the plurality of nodes in said any one of the plural second networks.

19. The non-transitory computer-readable medium of claim 15, wherein the expiry time of the timer equals a current value of the timer plus a timeout value of the request packet.

20. A method of congestion control in an internetwork having a first network and at least plural second networks, the method comprising:

in the first network, establishing a packet queue and a packet-in-flight counter for each one of the plural second networks in the internetwork, and for request packets that are to be sent from any node in the first network to any one of a plurality of nodes in one of the plural second networks:

loading a respective packet queue of said any one of the plural second networks with at least one request packet;

sending the at least one request packet from the respective packet queue of said any one of the plural second networks to any of the plurality of nodes in said any one of the plural second networks;

adjusting a value of the respective packet-in-flight counter of said any one of the plural second networks to which at least one request packet is sent, in one direction when the at least one request packet is sent to any of the plurality of nodes in said any one of the plural second networks, and adjusting said respective packet in-flight counter of said any one of the plural second networks to which a request packet is sent in the other direction when a response packet is received from any of the plurality of nodes in said any one of the plural second networks; and determining whether another request packet can be sent to any of the plurality of nodes in said any one of the plural second networks based on a value of the respective packet-in-flight counter for said any one of the plural second networks.

21. The method of claim 4, wherein an expiry time of the timer of the first network node equals a current value of the timer plus a timeout value of the request packet sent from the node in the first network to said any one of the plural second networks.

22. The method of claim 4, further comprising:

decrementing the respective packet-in-flight counter of said any one of the plural second networks to which a request packet is sent when an expiry time of the timer of the first network is exceeded.

23. The method of claim 22, wherein the expiry time of the timer of the first network equals a current value of the timer plus a timeout value of the request packet sent from the first network to the any of a plurality of nodes in the any one of the plural second networks.

* * * * *